W. STORRIE.
SHOCK ABSORBER.
APPLICATION FILED MAR. 18, 1914.
1,279,035.
Patented Sept. 17, 1918.
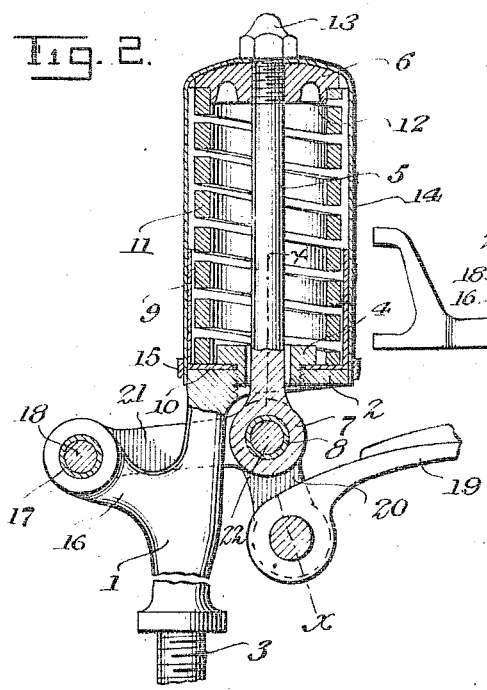
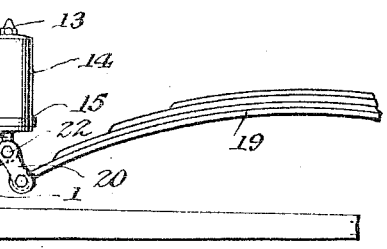
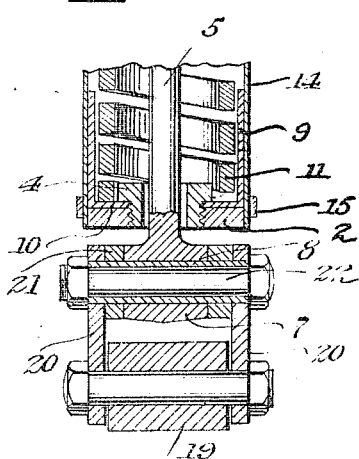
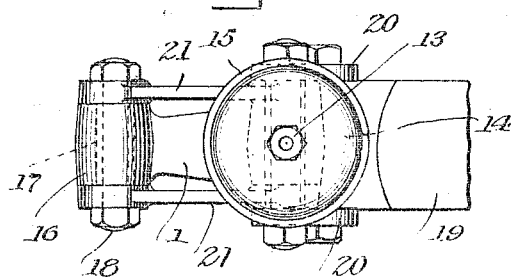
Inventor
William Storrie
Witnesses
C. C. Faunce.
V. B. Hillyard.
By Victor J. Evans
Attorney

UNITED STATES PATENT OFFICE.

WILLIAM STORRIE, OF PROVIDENCE, RHODE ISLAND, ASSIGNOR TO THE K-W IGNITION COMPANY, OF CLEVELAND, OHIO, A CORPORATION OF OHIO.

SHOCK-ABSORBER.

1,279,035.  Specification of Letters Patent.  Patented Sept. 17, 1918.

Application filed March 13, 1914. Serial No. 825,568.

*To all whom it may concern:*

Be it known that I, WILLIAM STORRIE, a citizen of the United States, residing at Providence, in the county of Providence and State of Rhode Island, have invented new and useful Improvements in Shock-Absorbers, of which the following is a specification.

The present invention relates to means for absorbing the vibrations and shocks in vehicle springs to such an extent as not to cause annoyance to the rider and strain to the springs of the vehicle, which would tend to cause such springs to crack or otherwise become disabled.

The invention provides a shock absorber embodying an expansible helical spring and supporting means therefor of novel formation, one of such supports being secured to the axle and the other being shackled or otherwise attached to the vehicle spring, the parts being arranged to control the vibrations or shocks not taken up quick enough by the main spring and thereby overcome the objectionable features herein mentioned.

The invention also provides a device which supplements the action of the main spring of the vehicle and also serves to neutralize the vibration and other shocks which are not ordinarily taken up by the main spring of the vehicle and which tend to add to the inconvenience of the rider.

The invention also further provides an appliance which while acting as a shock absorber does not interfere with the maximum movements of the main spring and which is of such construction as not to be materially affected by side movement which would tend ordinarily to produce ineffective action and cause lateral strain and render the efficiency of the device comparatively short-lived.

The invention consists of the novel features, details of construction and combination of parts, which hereinafter will be more particularly set forth, illustrated and claimed.

In the drawings hereto attached:—

Figure 1 is a detail view showing the application of the invention.

Fig. 2 is a vertical section.

Fig. 3 is a top plan view.

Fig. 4 is a section on the line $x$—$x$ of Fig. 2 looking in the direction of the arrow.

Corresponding and like parts are referred to in the following description, and indicated in all the views of the drawing, by the same reference characters.

The device comprises a bracket which is adapted to be secured to the axle, a rod adapted to be connected by means of a shackle or otherwise to the vehicle spring and bracket, and an interposed expansible helical spring. The bracket comprises an arm 1 and base 2, said arm being adapted to be secured to the axle of the vehicle in any manner as by means of a threaded shank 3. The base 2 is arranged to occupy an approximately horizontal position and is formed with a central opening in which is fitted a bushing 4 which retains the spring seat, shell 9. The rod 5 extends vertically and is provided at its upper end with a yoke 6 and at its lower end with an eye 7 which extends transversely and receives a bushing 8. A shell 9 is mounted upon the base 2 and is provided at its lower end with an inturned flange 10 which is confined between the base 2 and an outer flange at the upper end of the bushing 4. The shell 9 receives the lower portion of an expansible, helical spring 11 which is supported upon the base of the bracket. The spring 11 rests upon the inturned flange 10 and is prevented from lateral movement by means of the shell 9. The yoke is secured to the upper end of the rod 5 in any manner and rests upon the spring 11 and is retained in position thereon against lateral displacement by means of a raised portion 12 which enters a spring 11. As shown the upper end of the rod 5 is threaded and passes through an opening of the yoke 6 and receives a nut 13. A housing 14 consisting of a shell incloses the spring and shell 9 and extends over the yoke 6 and serves to exclude foreign matter from the spring and to prevent the escape of any lubricant applied to such spring and the shell 9. The housing 14 moves with the yoke 6 and rod 5, and is strengthened at its lower end by means of a band 15 which also gives a finished appearance thereto.

The arm of the bracket 1 has an offset portion 16 in which is formed a transverse opening to receive a bushing 17 and pin 18. The vehicle spring 19 is connected by means of a shackle or links 20 with the rod 5 and other links 21. Under normal conditions the links 20 have an upright position and the links 21 a horizontal arrangement. A pin 22 connects the links 20 and 21 and the rod 5. The bushing 8 mounted upon the pin 22 passes through the eye 7 of the rod 5 and through the openings of the links 21. The links 20 and 21 have a toggle arrangement and admit of the spring 11 supplementing the action of the spring 19 as also providing for the neutralizing of shock and vibration with the result that the occupant of the vehicle experiences comfort in riding and the vehicle is free from jar which ordinarily would add materially to the wear of the parts.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired, as are within the scope of the invention as claimed.

Having thus described the invention, what is claimed as new is:—

1. In combination, a support embodying a base and an off standing portion, a yieldable device mounted upon the said base, a connection suspended from the yieldable device and passing therethrough and through the base, links embracing the support and the off standing portion thereof and pivotally connected at one end to such off standing portion and at its opposite end to the before mentioned connection and other links connecting the vehicle spring with the first mentioned links and the said connection, said links having a toggle arrangement.

2. A device of the character set forth, comprising a bracket embodying an arm, base, and off standing portion, said base having an opening, a flanged bushing fitted in the opening of the base, a shell mounted upon the base and having an inturned flange which is confined thereto by means of the flanged bushing, an expansible helical spring mounted upon the base, a rod passing through the spring and base and having an eye at its lower end, a yoke connected to the upper end of said rod and mounted upon the spring, a housing inclosing the yoke, spring, and shell links embracing the arm and off standing portion of the bracket and pivoted at one end to such off standing portion and pivoted at its opposite end to the before mentioned rod.

3. In a vehicle spring suspension device, the combination, with an axle, a support secured thereto, and a radius link pivoted to said support, of two classes of springs arranged substantially in the plane of said axle, one being a substantially horizontal leaf spring and the other a coil spring substantially in the vertical, the former connected to the radius link by a shackle, and the latter carrying a rod connected to the radius link and supported by said support, substantially as and for the purposes described.

4. In a vehicle spring suspension device, the combination, with an axle, a support secured thereto, and a radius link pivoted to said support, of two classes of springs arranged substantially in the plane of said axle, one being a substantially horizontal leaf spring and the other a coil spring substantially in the vertical, the former connected to the radius link and the latter carrying a rod connected to the radius link and supported by said support.

5. In a vehicle spring suspension device, a support, said support having a shoulder and an extension of less width than the shoulder, said extension being adapted for mounting in a vehicle axle a resilient element seated upon said support, a member engaging an end of the resilient element and adapted to move toward the support to compress the resilient element against the support, means connected with the said member and adapted for connection to a vehicle spring, and a radius link pivotally connected to the support and to said means.

6. A vehicle spring suspension comprising a support having a base part extending substantially at right angles to the support, said support also having a shoulder and an extension of less width than the shoulder, said extension being adapted for mounting in a vehicle axle, a resilient element seated upon the base which forms an abutment against which said element may be compressed, a yoke engaging an end of the resilient element, a rod extending longitudinally with respect to the resilient element, and a radius link pivoted to the support and to the rod.

7. In combination, an axle, a support secured to the axle, a resilient element seated upon the support which forms an abutment against which said element may be compressed, a vehicle spring extending substantially parallel with the axle, a member engaging an end of the resilient element, means connecting the said member with the spring and a radius link pivotally connected to the support and to the said means for the purpose described.

8. In combination, an axle, a support carried thereby, a resilient element seated upon said support, a yoke engaging an end of the resilient member, a rod connected to the yoke and adapted to be moved in a linear direction to compress the resilient element toward and against the support, a vehicle spring extending substantially parallel with the axle of the vehicle, means for connecting the said rod with the end of the spring, and a radius link pivoted to the support and to the rod for the purpose described.

9. In combination, an axle, a support mounted upon the axle, said support having a base with an opening therethrough, a resilient member mounted upon said base which serves as an abutment against which the resilient element is compressed, and a yoke engaging an end of the resilient member, a rod secured to the yoke and extending axially through the resilient member and through the opening in the said base, said support having a projecting portion, a radius link pivotally mounted upon the said projection and upon the end of the rod, a vehicle spring extending substantially parallel with the axle, and a toggle link connecting the end of the spring to the end of the rod.

10. A vehicle spring suspension device comprising a support, a resilient element seated upon the support, a member engaging the resilient element, a member operatively connected to an end of the spring and adapted for connection to a vehicle spring, a radius link pivotally connected to the support and to the last mentioned member and a casing surrounding the resilient element and mounted to move with the resilient element.

11. A vehicle spring suspension device comprising a support having an extension, a resilient element seated upon said extension, a yoke engaging the resilient member, a rod connected to the yoke and adapted for connection with a vehicle spring, a radius link pivotally connected to the support and to the last mentioned member and a casing surrounding the resilient element and mounted to move with the resilient element.

12. A vehicle spring suspension device comprising a support having an extension, a casing upon said extension, a resilient element having an end portion mounted within said casing, a yoke member engaging the said resilient member, a second casing surrounding the upper part of the resilient member and telescoping with the first mentioned casing, a rod secured to the yoke and extending axially through the resilient element and adapted at its free end for connection with a vehicle spring, and a radius link pivotally connected with the support and with the said rod for the purpose described.

In testimony whereof I affix my signature in presence of two witnesses.

WILLIAM STORRIE.

Witnesses:
W. W. WILSON,
FREDERICK H. BRATESMAN.